(12) United States Patent  
Goenka et al.

(10) Patent No.: US 8,261,868 B2
(45) Date of Patent: Sep. 11, 2012

(54) ENERGY MANAGEMENT SYSTEM FOR A HYBRID-ELECTRIC VEHICLE

(75) Inventors: Lakhi N. Goenka, Ann Arbor, MI (US); Douglas T. Crane, Pasadena, CA (US); Lon E. Bell, Altadena, CA (US)

(73) Assignee: BSST LLC, Irwindale, CA (US)

( * ) Notice: Subject to any disclaimer, the term of this patent is extended or adjusted under 35 U.S.C. 154(b) by 0 days.

(21) Appl. No.: 12/966,801

(22) Filed: Dec. 13, 2010

(65) Prior Publication Data

US 2011/0079023 A1    Apr. 7, 2011

Related U.S. Application Data

(63) Continuation of application No. 11/184,742, filed on Jul. 19, 2005.

(51) Int. Cl.
*B60K 11/00* (2006.01)
(52) U.S. Cl. .................. 180/68.2; 180/65.29
(58) Field of Classification Search ............ 180/68.2; 165/41, 42, 43, 236, 902, 10, 4; 237/12.3 R, 237/12.3 A
See application file for complete search history.

(56) References Cited

U.S. PATENT DOCUMENTS

| | | | |
|---|---|---|---|
| 2,363,168 A | 11/1944 | Findley |
| 2,944,404 A | 7/1960 | Fritts |
| 2,949,014 A | 8/1960 | Belton, Jr. et al. |
| 2,984,077 A | 5/1961 | Gaskill |
| 3,085,405 A | 4/1963 | Frantti |
| 3,125,860 A | 3/1964 | Reich |
| 3,137,142 A | 6/1964 | Venema |
| 3,138,934 A | 6/1964 | Roane |
| 3,213,630 A | 10/1965 | Mole |
| 3,236,056 A | 2/1966 | Phillips et al. |
| 3,252,504 A | 5/1966 | Newton |
| 3,527,621 A | 9/1970 | Newton |
| 3,635,037 A | 1/1972 | Hubert |
| 3,681,929 A | 8/1972 | Schering |

(Continued)

FOREIGN PATENT DOCUMENTS

CN     1195090     10/1998

(Continued)

OTHER PUBLICATIONS

Derwent—ACC-No. 1998-283540, Kwon, H et al., Hyundai Motor Co., corresponding to KR 97026106 A, published Jun. 24, 1997 (2 pages).

(Continued)

*Primary Examiner* — Katy M Ebner
(74) *Attorney, Agent, or Firm* — Knobbe, Martens, Olson & Bear, LLP

(57) ABSTRACT

Some embodiments provide a system for optimizing electrical power management in a vehicle. The system includes a HVAC device and a thermal storage device, both configured to provide heating and cooling to an occupant compartment of the vehicle. The system further includes a controller connected to an electrical storage device and an electrical generating device. The controller receives electrical power generated by the electrical generating device and directs the electrical power to satisfy the vehicle's power requirements and/or stores the electrical power in at least one of the electrical storage device and the thermal storage device. Furthermore, the controller directs at least one of the HVAC device and the thermal storage device to provide heating and cooling to the occupant compartment of the vehicle, depending on the available storage of the thermal storage unit or occupant compartment demands.

24 Claims, 2 Drawing Sheets

U.S. PATENT DOCUMENTS

| | | |
|---|---|---|
| 3,779,307 A | 12/1973 | Weiss et al. |
| 3,817,043 A | 6/1974 | Zoleta |
| 3,885,126 A | 5/1975 | Sugiyama et al. |
| 4,038,831 A | 8/1977 | Gaudel et al. |
| 4,047,093 A | 9/1977 | Levoy |
| 4,065,936 A | 1/1978 | Fenton et al. |
| 4,402,188 A | 9/1983 | Skala |
| 4,444,851 A | 4/1984 | Maru |
| 4,448,028 A | 5/1984 | Chao et al. |
| 4,494,380 A | 1/1985 | Cross |
| 4,634,803 A | 1/1987 | Mathiprakasam |
| 4,665,707 A | 5/1987 | Hamilton |
| 4,753,682 A | 6/1988 | Cantoni |
| 4,823,554 A | 4/1989 | Trachtenberg et al. |
| 4,848,090 A | 7/1989 | Peters |
| 4,858,069 A | 8/1989 | Hughes |
| 4,905,475 A | 3/1990 | Tuomi |
| 4,922,721 A | 5/1990 | Robertson et al. |
| 4,922,998 A | 5/1990 | Carr |
| 4,988,847 A | 1/1991 | Argos et al. |
| 5,029,446 A | 7/1991 | Suzuki |
| 5,038,569 A | 8/1991 | Shirota et al. |
| 5,092,129 A | 3/1992 | Bayes et al. |
| 5,097,829 A | 3/1992 | Quisenberry |
| 5,111,664 A | 5/1992 | Yang |
| 5,119,640 A | 6/1992 | Conrad |
| 5,167,129 A | 12/1992 | Akasaka |
| 5,180,293 A | 1/1993 | Hartl |
| 5,193,347 A | 3/1993 | Apisdorf |
| 5,198,930 A | 3/1993 | Muratomi |
| 5,232,516 A | 8/1993 | Hed |
| 5,291,960 A * | 3/1994 | Brandenburg et al. .... 180/65.27 |
| 5,300,197 A | 4/1994 | Mitani et al. |
| 5,316,078 A | 5/1994 | Cesaroni |
| 5,385,020 A | 1/1995 | Gwilliam et al. |
| 5,407,130 A | 4/1995 | Uyeki et al. |
| 5,419,980 A | 5/1995 | Okamoto et al. |
| 5,431,021 A | 7/1995 | Gwilliam et al. |
| 5,448,891 A | 9/1995 | Nakagiri et al. |
| 5,450,894 A | 9/1995 | Inoue et al. |
| 5,483,807 A | 1/1996 | Abersfelder et al. |
| 5,499,504 A | 3/1996 | Mill et al. |
| 5,549,153 A | 8/1996 | Baruschke et al. |
| 5,566,774 A | 10/1996 | Yoshida |
| 5,576,512 A | 11/1996 | Doke |
| 5,592,363 A | 1/1997 | Atarashi et al. |
| 5,653,111 A | 8/1997 | Attey et al. |
| 5,713,426 A | 2/1998 | Okamura |
| 5,722,249 A | 3/1998 | Miller, Jr. |
| 5,724,818 A | 3/1998 | Iwata et al. |
| 5,725,048 A | 3/1998 | Burk et al. |
| 5,802,856 A | 9/1998 | Schaper et al. |
| 5,890,371 A | 4/1999 | Rajasubramanian et al. |
| 5,901,572 A | 5/1999 | Peiffer et al. |
| RE36,242 E | 6/1999 | Apisdorf |
| 5,918,930 A | 7/1999 | Kawai et al. |
| 5,921,088 A | 7/1999 | Imaizumi et al. |
| 5,964,092 A | 10/1999 | Tozuka et al. |
| 5,966,941 A | 10/1999 | Ghoshal |
| 5,977,785 A | 11/1999 | Burward-Hoy |
| 5,987,890 A | 11/1999 | Chiu et al. |
| 6,050,326 A | 4/2000 | Evans |
| 6,059,198 A | 5/2000 | Moroi et al. |
| 6,084,172 A | 7/2000 | Kishi et al. |
| 6,105,659 A | 8/2000 | Pocol et al. |
| 6,119,463 A | 9/2000 | Bell |
| 6,122,588 A | 9/2000 | Shehan et al. |
| 6,127,766 A | 10/2000 | Roidt |
| 6,138,749 A | 10/2000 | Kawai et al. |
| 6,158,225 A | 12/2000 | Muto et al. |
| 6,203,939 B1 | 3/2001 | Wilson |
| 6,205,805 B1 | 3/2001 | Takahashi et al. |
| 6,213,198 B1 | 4/2001 | Shikata et al. |
| 6,223,539 B1 | 5/2001 | Bell |
| 6,230,496 B1 | 5/2001 | Hofmann et al. |
| 6,270,015 B1 | 8/2001 | Hirota |
| 6,282,907 B1 | 9/2001 | Ghoshal |
| 6,293,107 B1 | 9/2001 | Kitagawa |
| 6,302,196 B1 | 10/2001 | Haussmann |
| 6,324,860 B1 | 12/2001 | Maeda et al. |
| 6,334,311 B1 | 1/2002 | Kim et al. |
| 6,347,521 B1 | 2/2002 | Kadotani et al. |
| 6,366,832 B2 | 4/2002 | Lomonaco et al. |
| 6,385,976 B1 | 5/2002 | Yamamura et al. |
| 6,393,842 B2 | 5/2002 | Kim |
| 6,401,462 B1 | 6/2002 | Bielinski |
| 6,407,435 B1 | 6/2002 | Ma et al. |
| 6,412,287 B1 | 7/2002 | Hughes et al. |
| 6,457,324 B2 | 10/2002 | Zeigler et al. |
| 6,464,027 B1 | 10/2002 | Dage et al. |
| 6,481,213 B2 | 11/2002 | Carr et al. |
| 6,499,306 B2 | 12/2002 | Gillen |
| 6,510,696 B2 | 1/2003 | Guttman et al. |
| 6,530,231 B1 | 3/2003 | Nagy et al. |
| 6,530,920 B1 | 3/2003 | Whitcroft et al. |
| 6,539,725 B2 | 4/2003 | Bell |
| 6,539,729 B2 | 4/2003 | Tupis et al. |
| 6,548,750 B1 | 4/2003 | Picone |
| 6,554,088 B2 | 4/2003 | Severinsky et al. |
| 6,560,968 B2 | 5/2003 | Ko |
| RE38,128 E | 6/2003 | Gallup et al. |
| 6,598,403 B1 | 7/2003 | Ghoshal |
| 6,598,405 B2 | 7/2003 | Bell |
| 6,605,773 B2 | 8/2003 | Kok |
| 6,606,877 B2 | 8/2003 | Tomita et al. |
| 6,611,115 B2 | 8/2003 | Wakashiro et al. |
| 6,625,990 B2 | 9/2003 | Bell |
| 6,653,002 B1 | 11/2003 | Parise |
| 6,672,076 B2 | 1/2004 | Bell |
| 6,682,844 B2 | 1/2004 | Gene |
| 6,705,089 B2 | 3/2004 | Chu et al. |
| 6,722,139 B2 | 4/2004 | Moon et al. |
| 6,732,534 B2 | 5/2004 | Spry |
| 6,779,348 B2 | 8/2004 | Taban |
| 6,792,259 B1 | 9/2004 | Parise |
| 6,796,399 B2 | 9/2004 | Satou et al. |
| 6,803,766 B2 | 10/2004 | Kobayashi et al. |
| 6,807,811 B2 | 10/2004 | Lee |
| 6,810,977 B2 | 11/2004 | Suzuki |
| 6,812,395 B2 | 11/2004 | Bell |
| 6,862,892 B1 | 3/2005 | Meyer et al. |
| 6,880,346 B1 | 4/2005 | Tseng et al. |
| 6,886,356 B2 | 5/2005 | Kubo et al. |
| 6,894,369 B2 | 5/2005 | Irino et al. |
| 6,896,047 B2 | 5/2005 | Currle et al. |
| 6,907,739 B2 | 6/2005 | Bell |
| 6,942,728 B2 | 9/2005 | Caillat et al. |
| 6,948,321 B2 | 9/2005 | Bell |
| 6,973,799 B2 | 12/2005 | Kuehl et al. |
| 6,975,060 B2 | 12/2005 | Styblo et al. |
| 6,986,247 B1 | 1/2006 | Parise |
| 7,007,491 B2 | 3/2006 | Grimm et al. |
| 7,089,756 B2 | 8/2006 | Hu |
| 7,100,369 B2 | 9/2006 | Yamaguchi et al. |
| 7,134,288 B2 | 11/2006 | Crippen et al. |
| 7,231,772 B2 | 6/2007 | Bell |
| 7,246,496 B2 | 7/2007 | Goenka et al. |
| 7,310,953 B2 | 12/2007 | Pham et al. |
| 7,380,586 B2 | 6/2008 | Gawthrop |
| 7,426,835 B2 | 9/2008 | Bell |
| 7,743,614 B2 | 6/2010 | Goenka et al. |
| 7,926,293 B2 | 4/2011 | Bell |
| 2001/0029974 A1 | 10/2001 | Cohen et al. |
| 2003/0140636 A1 | 7/2003 | Van Winkle |
| 2004/0045594 A1 | 3/2004 | Hightower |
| 2004/0076214 A1 | 4/2004 | Bell et al. |
| 2004/0093889 A1 | 5/2004 | Bureau et al. |
| 2004/0237541 A1 | 12/2004 | Murphy |
| 2004/0267408 A1 | 12/2004 | Kramer |
| 2005/0061497 A1 | 3/2005 | Amaral |
| 2005/0067862 A1 | 3/2005 | Iqbal et al. |
| 2005/0074646 A1 | 4/2005 | Rajashekara et al. |
| 2005/0081834 A1 | 4/2005 | Perkins |
| 2005/0139692 A1 | 6/2005 | Yamamoto |
| 2005/0178128 A1 | 8/2005 | Harwood et al. |
| 2005/0247336 A1 | 11/2005 | Inaoka |
| 2005/0257531 A1 | 11/2005 | Kadle et al. |

| | | | | | |
|---|---|---|---|---|---|
| 2005/0263176 A1 | 12/2005 | Yamaguchi et al. | GB | 2 267 338 | 12/1993 |
| 2005/0268621 A1 | 12/2005 | Kadle et al. | JP | 39-27735 | 12/1964 |
| 2005/0278863 A1 | 12/2005 | Bahash et al. | JP | 56-18231 | 2/1981 |
| 2005/0279105 A1 | 12/2005 | Pastorino | JP | 01 131830 A | 5/1989 |
| 2006/0005548 A1 | 1/2006 | Ruckstuhl | JP | 281344 | 11/1989 |
| 2006/0075758 A1 | 4/2006 | Rice et al. | JP | 04 103925 | 4/1992 |
| 2006/0150657 A1* | 7/2006 | Spurgeon et al. ............... 62/331 | JP | 4-165234 | 6/1992 |
| 2006/0157102 A1 | 7/2006 | Nakajima et al. | JP | 07-54189 | 6/1995 |
| 2006/0174633 A1 | 8/2006 | Beckley | JP | 7 156645 | 6/1995 |
| 2006/0188418 A1 | 8/2006 | Park et al. | JP | 07-253224 | 10/1995 |
| 2006/0254285 A1 | 11/2006 | Lin | JP | 9-089284 A | 4/1997 |
| 2007/0000255 A1 | 1/2007 | Elliot et al. | JP | 09-254630 | 9/1997 |
| 2007/0017666 A1 | 1/2007 | Goenka et al. | JP | 10035268 | 2/1998 |
| 2007/0056295 A1 | 3/2007 | De Vilbiss | JP | 10238406 A | 9/1998 |
| 2007/0214799 A1 | 9/2007 | Goenka | JP | 2000-161721 | 6/2000 |
| 2007/0272290 A1 | 11/2007 | Sims et al. | JP | 2000-274874 | 10/2000 |
| 2008/0028768 A1 | 2/2008 | Goenka | JP | 2001304778 | 10/2001 |
| 2008/0028769 A1 | 2/2008 | Goenka | JP | 2002059736 A | 2/2002 |
| 2008/0230618 A1 | 9/2008 | Gawthrop | JP | 2003175720 A | 6/2003 |
| 2008/0250794 A1 | 10/2008 | Bell | JP | 2004 050870 | 2/2004 |
| 2008/0307796 A1 | 12/2008 | Bell et al. | JP | 2005-212564 | 8/2005 |
| 2009/0000310 A1 | 1/2009 | Bell et al. | SE | 337 227 | 5/1971 |
| 2009/0007572 A1 | 1/2009 | Bell et al. | SU | 184886 A | 7/1966 |
| 2010/0052374 A1 | 3/2010 | Bell et al. | WO | WO 95/01500 | 1/1995 |
| 2010/0101238 A1 | 4/2010 | LaGrandeur et al. | WO | WO 96/05475 | 2/1996 |
| 2010/0101239 A1 | 4/2010 | LaGrandeur et al. | WO | WO 9722486 A1 | 6/1997 |
| 2010/0155018 A1 | 6/2010 | Goenka et al. | WO | WO 97/47930 | 12/1997 |
| 2010/0287952 A1 | 11/2010 | Goenka | WO | WO 9856047 A1 | 12/1998 |
| 2010/0291414 A1 | 11/2010 | Bell et al. | WO | WO 99/10191 | 3/1999 |
| 2010/0313576 A1 | 12/2010 | Goenka | WO | WO 99/58907 | 11/1999 |
| 2011/0067742 A1 | 3/2011 | Bell et al. | WO | WO 02/00458 | 1/2002 |
| 2011/0107773 A1 | 5/2011 | Gawthrop | WO | WO 03/014634 | 2/2003 |
| 2011/0236731 A1 | 9/2011 | Bell et al. | WO | WO 2005/023571 | 3/2005 |
| | | | WO | WO 2006/037178 A | 4/2006 |
| | | | WO | WO 2006/064432 | 6/2006 |
| | | | WO | WO 2007/001289 | 1/2007 |
| | | | WO | WO 2008/147305 A1 | 4/2008 |
| | | | WO | WO 2008/123663 | 10/2008 |
| | | | WO | WO 2008/148042 | 12/2009 |
| | | | WO | WO 2010/048575 | 4/2010 |

FOREIGN PATENT DOCUMENTS

| | | |
|---|---|---|
| DE | 13 01 454 | 8/1969 |
| DE | 2319155 | 10/1974 |
| DE | 197 30 678 | 1/1999 |
| DE | 199 51 224 | 5/2001 |
| EP | 0 389 407 | 9/1990 |
| EP | 0418995 B1 | 3/1991 |
| EP | 0 545 021 | 6/1993 |
| EP | 0 791 497 | 8/1997 |
| EP | 1641067 A1 | 3/2006 |
| EP | 1 932 695 A1 | 6/2008 |
| FR | 2806666 | 9/2001 |
| FR | 2 879 728 | 6/2006 |
| GB | 1 040 485 | 8/1966 |

OTHER PUBLICATIONS

Lofy, John et al., "Thermoelectrics for Environmental Control Automobiles," 21st International Conference on Thermoelectronics, 2002, p. 471-476.

\* cited by examiner

ENERGY MANAGEMENT SYSTEM FOR A HYBRID-ELECTRIC VEHICLE

RELATED APPLICATION

This application is a continuation of U.S. application Ser. No. 11/184,742, filed Jul. 19, 2005, titled ENERGY MANAGEMENT SYSTEM FOR A HYBRID-ELECTRIC VEHICLE, the entire contents of which are incorporated by reference herein and made a part of this specification.

BACKGROUND

1. Field

The present invention generally relates to energy management systems of a vehicle, in more particularly to energy management systems of a hybrid-electric vehicle.

2. Description of Related Art

A hybrid-electric vehicle uses an electric motor in conjunction with a conventional internal combustion engine to create torque to drive its wheels. When the driver of the hybrid-electric vehicle applies the brakes, the hybrid-electric vehicle reverses the function of the electric motor, thus, turning the electric motor into an electric generator. As the hybrid-electric vehicle approaches the stop, the wheels of the hybrid-electric vehicle, in conjunction with the electric motor acting as an electric generator, generate a pulse of electrical power. This pulse of electrical power is stored in an energy storage device such as a capacitor or battery and later used to drive the wheels and/or power the vehicle accessories, such as a heating, ventilation and air conditioning ("HVAC") system. However, because of the nature of the pulse, when storing the electrical power, some of the electrical power is lost due to parasitic losses.

The electric motor, acting as an electric generator, is not the only source of electrical power in a hybrid-electric vehicle. For example, an alternator and heat capture devices, such as thermoelectric devices placed on the exhaust of the hybrid-electric vehicle, may be utilized to generate electrical power. This electrical power may be stored in an energy storage device. Similar to the electrical power generated by the electric motor, some of the generated electrical power is lost due to parasitic losses.

When the hybrid-electric vehicle is at a stop, it is common for the hybrid-electric vehicle to shut down its internal combustion engine. However, when the HVAC system of the hybrid-electric vehicle is in operation, the hybrid-electric vehicle may have to drain the energy storage device and/or keep the internal combustion engine operating in order to keep the HVAC system running. These demands will decrease fuel economy.

Therefore, it is desire to provide a more efficient system for providing heating and cooling to the occupant compartment of the hybrid-electric vehicle while maximizing the storage of the pulse of electrical power generated during braking and by the other electrical power generated by the hybrid-electric vehicle.

SUMMARY

In overcoming the drawbacks and limitations of the known technologies, a system method for managing electrical power generated by a vehicle is disclosed. The system includes a HVAC device and a thermal storage device both being configured to provide heating and cooling to an occupant compartment of the vehicle. The system further includes a controller connected to an electrical storage device and an electrical generating device. The electrical generating device may be several devices, such as an alternator, a regenerative braking generator and a waste recovery power generator. The controller will receive electrical power generated by the electrical generating device and store the electrical power in at least one of the electrical storage device and the thermal storage device. Furthermore, the controller will direct at least one above the HVAC device and the thermal storage device to provide heating and cooling to the occupant compartment of the vehicle.

As to the method, the method includes the steps of receiving electrical power, monitoring the available storage of the electrical and thermal storage devices and storing the electrical power received in at least one of the electrical storage device and the thermal storage device. Furthermore, the method may include the steps of storing the electrical power in the electrical storage device when the thermal storage device is at a maximum capacity and storing electrical power in the thermal storage device when the thermal storage device is below a maximum capacity.

The method may further include steps for providing heating and cooling to the occupant compartment of the vehicle. This includes monitoring the thermal requirements of the occupant compartment and providing heating and cooling to the occupant compartment from at least one of the thermal storage device and the HVAC device based upon the thermal requirements of the occupant compartment. If the thermal requirements of the occupant compartment can be met solely by the thermal storage device, the thermal storage device will provide the heating and cooling. However, if the thermal requirements of the occupant compartment will not be satisfied by the thermal storage device, the HVAC device may supplement the thermal storage device or solely provide the heating and cooling.

These and other advantages, features and embodiments of the invention will become apparent from the drawings, detailed description and claims which follow.

DETAILED DESCRIPTION

Figure 1:
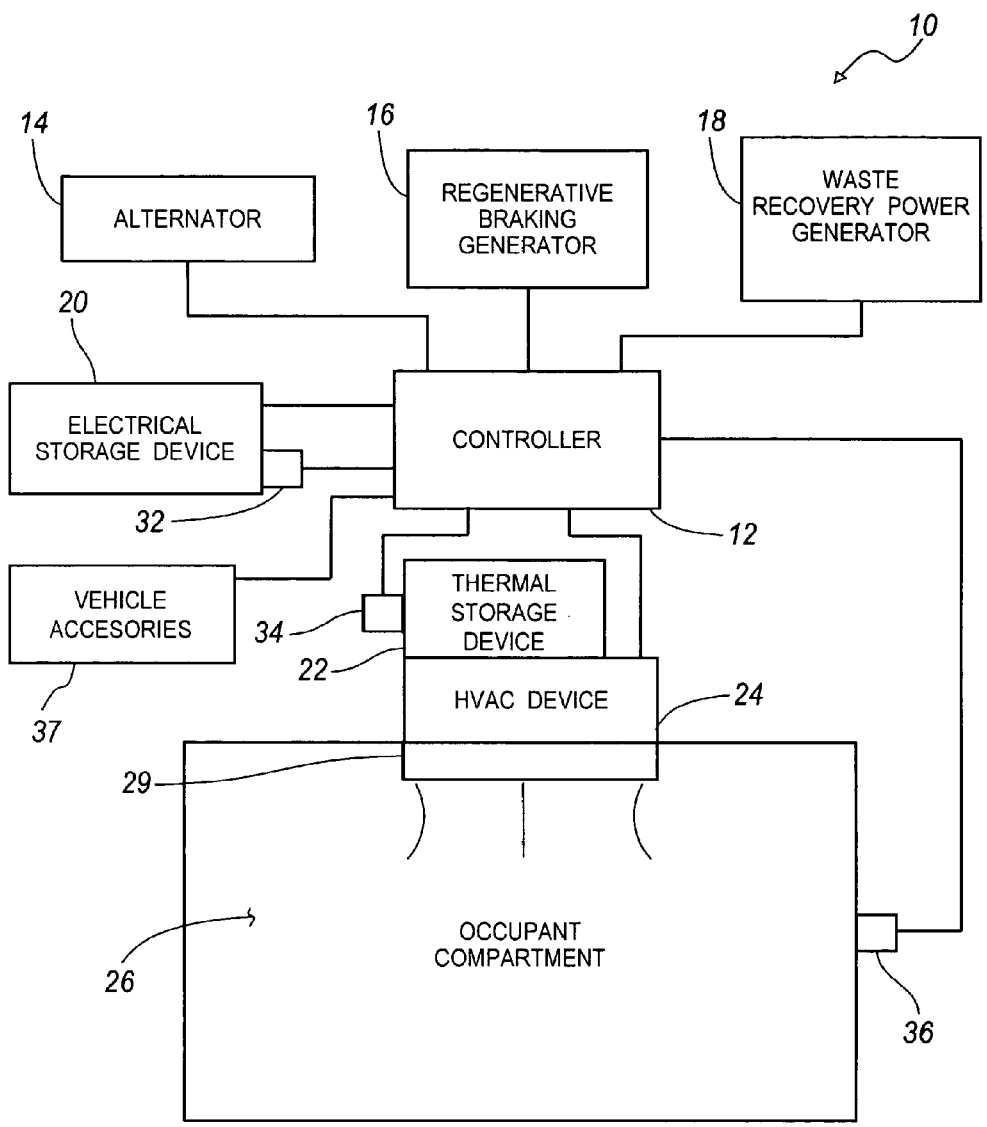
FIG. 1 is a block diagram of an energy management system for a vehicle embodying the principles of the present invention.

Referring to FIG. 1, the various components of an energy management system 10 for a vehicle according to one embodiment of the present invention are shown. The energy management system 10 includes a controller 12 connected to an alternator 14, a regenerative braking system generator 16, and a waste heat recovery system 18. The controller 12 may be one controller or multiple controllers in communication with each other.

The alternator 14 is preferably a belt driven alternator, driven by an engine (not shown) of the vehicle and has clutches that selectively create electrical power. The regenerative brake system generator 16 is preferably a regenerative braking system commonly used on hybrid-electric vehicles, which generate electrical power while the hybrid-electric vehicle is braking. The waste heat recovery generator system 18 is preferably a system for capturing heat created by the vehicle during operation. The waste heat recovery generator system 18 may be one or more thermoelectric modules located near areas of the vehicle which create heat, such as the exhaust and engine of the vehicle. Electrical power generated by the alternator 14, the regenerative braking system generator 16, and the waste heat recovery system 18 is directed to the controller 12.

The controller 12 is also connected to an electrical storage device 20 and stores electrical power generated by the alternator 14, the regenerative braking system generator 16, and the waste heat recovery system 18. The electrical storage device 20 is preferably one or more capacitors or batteries, but may be any device suitable for storing electrical power.

Connected to the controller 12 is a HVAC device 24. The HVAC device 24 is preferably an electrical HVAC device but may be a conventional belt driven device or any vehicle heating and cooling system that is now known or later developed. If a conventional belt driven HVAC system is utilized, a system of clutches may be implemented to selectively place the HVAC unit in an operating mode. One or more ducts 29 are coupled to the HVAC device 24 and direct conditioned, heated or cooled air from the HVAC device 24 to the occupant compartment 26.

A thermal storage device 22 is coupled to the HVAC unit 24. In certain situations described below, the HVAC unit 24 converts the electrical power directed to the HVAC unit 24 from the controller 12 into thermal power and stores this thermal power in the thermal storage device 22. Typically, one or more thermoelectric devices are utilized to convert the electrical power into thermal power but any suitable electrical power to thermal power conversion device may be used. In order to store the thermal power, the thermal storage device 22 may contain both a high and low temperature phase change material, such as wax (a high temperature phase change material) and water (a low temperature phase change material).

The energy management system 10 further includes an electrical storage level sensor 32 and a thermal storage temperature sensor 34 for determining the available amount of storage available for electrical and thermal power in the electrical storage device 20 and the thermal storage device 22, respectively. An occupant compartment temperature sensor 36 is connected to controller 12, such that the temperature of the occupant compartment can be monitored by the controller 12.

Last, the energy management system 10 further includes vehicle accessories 37 connected to the controller 12. The vehicle accessories 37 may include fuel injectors, interior and exterior lighting, vehicle information, entertainment and navigation systems or any electrical powered device found in the vehicle. The controller 12 direct electrical power to the accessories 37 as needed.

When in operation, the controller 12 will receive electrical power generated from at least one source, such as the alternator 14, the regenerative brake system generator 16 or the waste heat recovery system 18. The controller will monitor the available amount of storage remaining for electrical and thermal power storage by monitoring the output of the electrical storage level sensor 32 and the thermal storage temperature sensor 34, respectively. Based upon the remaining storage available in the thermal storage device 22, the controller 12 will direct the electrical power to either the electrical storage device 20 or the HVAC unit 24. The HVAC unit 24 will then function to convert the electrical power to thermal power and store the thermal power in the thermal storage device 22 for later use.

If the thermal storage device 22 has inadequate suitable storage for storing the thermal power, the electrical power will be directed to the electrical storage device 20. Alternatively, the controller 12 can direct a portion of the electrical power to be stored in the thermal storage device 22 and the rest of the electrical power to the electrical storage device 20. It is preferred to first store the electrical power in the thermal storage device 22, rather than the electrical storage device 20, because it is more efficient to store the thermal power in the thermal storage device 22.

The controller 12 will also monitor the temperature of the occupant compartment 26 via the occupant compartment temperature sensor 36 and direct the HVAC device 24 to provide heating or cooling to the occupant compartment 26. The HVAC may provide all or part of the heating and cooling to the occupant compartment 26 by using the thermal power stored in the thermal storage device 22 or may generate the required thermal power on its own. Also, the HVAC device 24 may supplement the heating and cooling it provides to the occupant compartment 26 with the thermal power stored in the thermal storage unit 22.

By having the thermal storage device 22 provide all or part of the heating and cooling to the occupant compartment 26, the vehicle may be able to not require HVAC device 24 to generate the necessary heating and cooling for extended periods of time. By minimizing the use of the HVAC device 24 for generating the heating and cooling, the vehicle will be able to achieve greater fuel efficiency.

Figure 2:
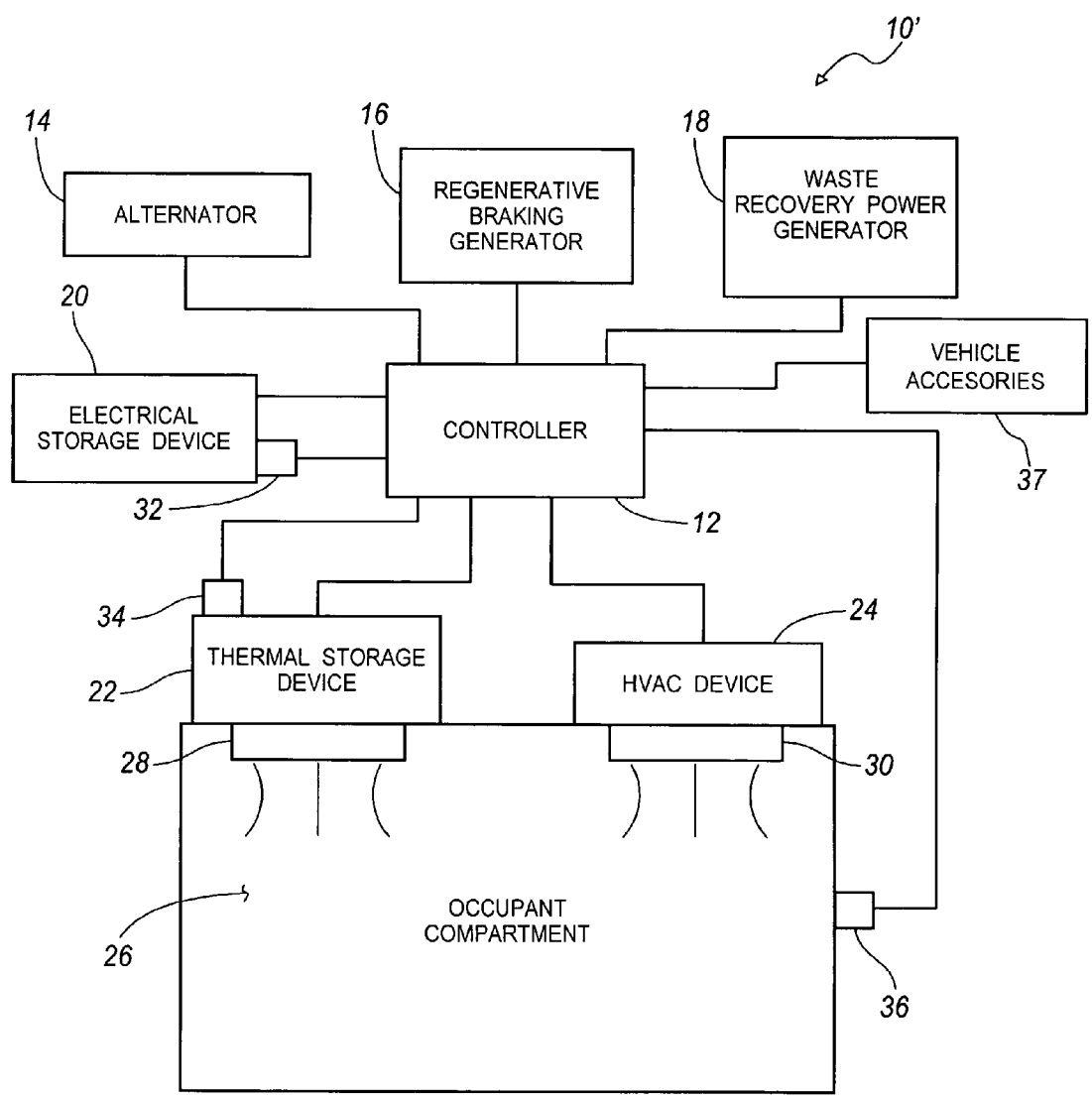
FIG. 2 is a block diagram of second embodiment of an energy management system for a vehicle according to the principles of the present invention.

Referring to FIG. 2, another embodiment of an energy management system 10' is shown therein, wherein similar reference numerals used in FIG. 2 denote identical components as in the embodiment of FIG. 1. The energy management system 10' differs from the one shown in FIG. 1 in that the thermal storage device 22 will receive electrical power directly from the controller 12, convert the electrical power to thermal power and store the thermal power. Furthermore, the HVAC device 24 and the thermal storage device 22 direct heated or cooled air to the occupant compartment 26 via separate ducts 28, 30, respectively.

The controller 12 is configured to determine if the occupant compartment 30 can be sufficiently heated or cooled by the thermal storage device 22 through the duct 28. If the occupant compartment 26 can be adequately heated or cooled by the thermal storage device 22, the controller 12 will direct the thermal storage device to provide the heating or cooling to the occupant compartment 26, while leaving the HVAC in an "off" state. However, if the controller 12 determines that the thermal storage device 22 is unable to provide adequate heating and cooling to the occupant compartment 26, the controller may direct the HVAC device 24 and the thermal storage device 22 to both provide adequate heating and cooling to the occupant compartment 26. Alternatively, if the thermal storage device 22 is unable to provide adequate heating and cooling to the occupant compartment 26, the controller may direct HVAC device 24 to solely provide heating and cooling to the occupant compartment 26.

The foregoing description of the embodiment of the invention has been presented for purposes of illustration and description. It is not intended to be exhaustive or to limit the invention to the precise embodiment disclosed. Numerous modifications or variations are possible in light of the above teaching. The embodiment discussed was chosen and described to provide the best illustration of the principles of the invention in its practical application to thereby enable one of ordinary skill in the art to utilize the invention in various embodiments and with various modifications as are suited to the particulate use contemplated. All such modifications and variations are within the scope of the invention as determined by the appended claims when interpreted in accordance with the breadth to which they are fairly, legally, and equitably entitled.

What is claimed is:

1. A method for providing conditioned air to an occupant compartment of a vehicle, the method comprising:
   receiving electrical energy from a power generating device;
   monitoring a thermal storage level of a thermal storage device;
   when the thermal storage device has available storage capacity, storing at least a portion of the electrical energy in the thermal storage device by:
      causing the at least a portion of the electrical energy to be converted into thermal energy; and
      storing the thermal energy in the thermal storage device;
   when the thermal storage device has inadequate available storage, storing at least a portion of the electrical energy in an electrical storage device; and
   providing conditioned air to the occupant compartment of the vehicle based on at least one of thermal requirements of the occupant compartment, the thermal storage level of the thermal storage device, or an electrical storage level of the electrical storage device;
   wherein the conditioned air is provided to the occupant compartment of the vehicle without directing a heating, ventilation, and air conditioning ("HVAC") device to provide the conditioned air to the occupant compartment when the occupant compartment can be sufficiently heated or cooled by the thermal storage device.

2. The method of claim 1, wherein the thermal storage device comprises a first energy storage material adapted to store thermal energy at a high temperature and a second energy storage material adapted to store thermal energy at a low temperature.

3. The method of claim 1, further comprising monitoring the available storage capacity of the electrical storage device.

4. The method of claim 1, further comprising storing a portion of the electrical energy in the thermal storage device and storing the rest of the electrical energy in the electrical storage device when the thermal storage device has inadequate available storage.

5. The method of claim 1, wherein the thermal storage device provides thermal energy to the conditioned air when the thermal storage device is able to meet the thermal requirements of the occupant compartment.

6. The method of claim 5, further comprising leaving the HVAC device in an off state while the occupant compartment can be adequately heated or cooled by the thermal storage device.

7. The method of claim 1, wherein the HVAC device and the thermal storage device provide at least some thermal energy to the conditioned air when the thermal storage device does not have adequate capacity to meet the thermal requirements of the occupant compartment.

8. The method of claim 1, wherein the HVAC device solely provides thermal energy to the conditioned air when the thermal storage device does not have adequate capacity to meet the thermal requirements of the occupant compartment.

9. The method of claim 1, further comprising determining whether to provide conditioned air to the occupant compartment using the thermal storage device, the HVAC device, or both the thermal storage device and the HVAC device based on whether the thermal storage device is able to provide adequate heating and cooling to the occupant compartment.

10. The method of claim 1, wherein causing the electrical energy to be converted into thermal energy comprises directing the electrical energy to the HVAC device and causing the HVAC device to convert the electrical energy to thermal energy.

11. A system for providing conditioned air to an occupant compartment of a vehicle, the system comprising:
   a power generating device configured to provide electrical energy;
   an electrical storage device;
   a thermal storage device;
   a thermal storage temperature sensor configured to monitor a thermal storage level of the thermal storage device; and
   a controller operatively connected to the power generating device, the electrical storage device, the thermal storage device, and the thermal storage level sensor, wherein the controller is configured to:
      when the thermal storage device has available storage capacity, cause at least a portion of the electrical energy to be converted into thermal energy and store the thermal energy in the thermal storage device; and
      when the thermal storage device has inadequate available storage, store at least a portion of the electrical energy in the electrical storage device;
   wherein the controller is configured to cause conditioned air to be provided to the occupant compartment of the vehicle based on at least one of thermal requirements of the occupant compartment, the thermal storage level of the thermal storage device, or an electrical storage level of the electrical storage device;
   wherein the conditioned air is provided to the occupant compartment of the vehicle without directing an HVAC device to provide the conditioned air to the occupant compartment when the occupant compartment can be sufficiently heated or cooled by the thermal storage device.

12. The system of claim 11, wherein the power generating device comprises an alternator, a waste energy recovery system, or a combination of an alternator and a waste energy recovery system.

13. The system of claim 11, wherein the controller is configured to direct airflow to an occupant compartment via a duct that is connected to the HVAC device.

14. The system of claim 11, further comprising an occupant compartment temperature sensor connected to the controller and configured to monitor a temperature of at least a portion of the occupant compartment.

15. The system of claim 11, further comprising an electrical storage level sensor connected to the controller and configured to monitor an available storage capacity of the electrical storage device.

16. The system of claim 11, further comprising a thermal storage device temperature sensor connected to the controller and configured to monitor an available storage capacity of the thermal storage device.

17. The system of claim 11, further comprising a waste heat recovery generator configured to capture heat created by components of the vehicle during operation of the vehicle.

18. The system of claim 17, wherein the waste heat recovery generator comprises one or more thermoelectric devices.

19. The system of claim 11, wherein the thermal storage device and the HVAC device are configured to direct heated or cooled air to the occupant compartment via separate ducts.

20. The system of claim 11, wherein one or more thermoelectric devices are used to convert the electrical energy into thermal energy for storage in the thermal storage device.

21. The system of claim 11, wherein the thermal storage device includes a high temperature storage material and a low temperature storage material.

22. The system of claim 11, wherein the power generating device comprises a regenerative brake system generator configured to generate electrical energy while the vehicle is braking and a waste heat recovery generator system having one or more thermoelectric modules configured to generate electrical energy from waste heat of the vehicle.

23. The system of claim 22, wherein the one or more thermoelectric modules are located near areas of the vehicle that create heat.

24. The system of claim 11, wherein the controller directs the thermal storage device to provide the heating or cooling to the occupant compartment while leaving the HVAC device in an off state when the occupant compartment can be adequately heated or cooled by the thermal storage device.

* * * * *

UNITED STATES PATENT AND TRADEMARK OFFICE
CERTIFICATE OF CORRECTION

PATENT NO. : 8,261,868 B2  
APPLICATION NO. : 12/966801  
DATED : September 11, 2012  
INVENTOR(S) : Goenka et al.

Page 1 of 1

It is certified that error appears in the above-identified patent and that said Letters Patent is hereby corrected as shown below:

On the Title Page:

In column 2 (page 3 item 56) at line 43, Under Other Publications, change "Thermoelectronics," to --Thermoelectrics,--.

In the Drawings:

Sheet 1 of 2 (Reference Numeral 37, FIG. 1) at line 2, Change "ACCESORIES" to --ACCESSORIES--.

Sheet 2 of 2 (Reference Numeral 37, FIG. 2) at line 2, Change "ACCESORIES" to --ACCESSORIES--.

Signed and Sealed this  
Twenty-fourth Day of September, 2013

Teresa Stanek Rea  
*Deputy Director of the United States Patent and Trademark Office*